US011627109B2

(12) United States Patent
 Dahlberg et al.

(10) Patent No.: US 11,627,109 B2
(45) Date of Patent: Apr. 11, 2023

(54) METHODS FOR MAPPING IP ADDRESSES AND DOMAINS TO ORGANIZATIONS USING USER ACTIVITY DATA

(71) Applicant: BitSight Technologies, Inc., Boston, MA (US)

(72) Inventors: Daniel Dahlberg, Somerville, MA (US); Stephen Boyer, Waltham, MA (US); Nagarjuna Venna, Waltham, MA (US); Philip John Steuart Gladstone, Carlisle, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 17/146,064

(22) Filed: Jan. 11, 2021

(65) Prior Publication Data

US 2021/0218702 A1    Jul. 15, 2021

Related U.S. Application Data

(63) Continuation of application No. 16/738,825, filed on Jan. 9, 2020, now Pat. No. 10,893,021, which is a
(Continued)

(51) Int. Cl.
*H04L 61/5007* (2022.01)
*H04L 43/00* (2022.01)
(Continued)

(52) U.S. Cl.
CPC .......... *H04L 61/5007* (2022.05); *H04L 43/00* (2013.01); *H04L 51/48* (2022.05);
(Continued)

(58) Field of Classification Search
CPC ..... H04L 61/2007; H04L 43/00; H04L 51/28; H04L 61/1505; H04L 61/1511; H04L 67/306
See application file for complete search history.

(56) References Cited

U.S. PATENT DOCUMENTS

| 5,867,799 A | 2/1999 | Lang et al. |
| 6,016,475 A | 1/2000 | Miller et al. |

(Continued)

FOREIGN PATENT DOCUMENTS

| CA | 3015146 A1 | 8/2017 |
| WO | WO-2017/142694 A1 | 1/2019 |
| WO | WO-2019/023045 A1 | 1/2019 |

OTHER PUBLICATIONS

"About Neo4j," 1 page.
(Continued)

*Primary Examiner* — Joe Chacko
(74) *Attorney, Agent, or Firm* — Goodwin Procter LLP

(57) ABSTRACT

A computer-implemented method is provided for mapping IP addresses and domain names to organizations. The method includes receiving, by a mapping system from an data provider, a dataset related to a plurality of users of the data provider. The dataset includes (a) an IP address for a user device of each user of the plurality of users, and (b) a domain name for a user account of each user of the plurality of users; enriching, by an analytics engine of the mapping system, the received dataset with enrichment data from an enrichment source; receiving, by the analytics engine from a storage medium, historical data relevant to the enriched dataset; and mapping, by the analytics engine, (i) the IP address and/or (ii) the domain name of each user of a portion of the plurality of users to an organization based on the enriched dataset and the historical data.

20 Claims, 4 Drawing Sheets

Related U.S. Application Data continuation of application No. 16/543,075, filed on Aug. 16, 2019, now Pat. No. 10,554,619, which is a continuation of application No. 16/015,686, filed on Jun. 22, 2018, now Pat. No. 10,425,380.

(60) Provisional application No. 62/523,416, filed on Jun. 22, 2017.

(51) Int. Cl.
  *H04L 51/48* (2022.01)
  *H04L 61/4505* (2022.01)
  *H04L 67/306* (2022.01)
  *H04L 61/4511* (2022.01)

(52) U.S. Cl.
  CPC ...... *H04L 61/4505* (2022.05); *H04L 61/4511* (2022.05); *H04L 67/306* (2013.01)

(56) References Cited

U.S. PATENT DOCUMENTS

| | | |
|---|---|---|
| 6,745,150 B1 | 6/2004 | Breiman |
| 6,792,401 B1 | 9/2004 | Nigro et al. |
| 7,062,572 B1 | 6/2006 | Hampton |
| D525,264 S | 7/2006 | Chotai |
| D525,629 S | 7/2006 | Chotai |
| 7,100,195 B1 | 8/2006 | Underwood |
| 7,194,769 B2 | 3/2007 | Lippmann et al. |
| 7,290,275 B2 | 10/2007 | Baudoin et al. |
| D604,740 S | 11/2009 | Matheny |
| 7,650,570 B2 | 1/2010 | Torrens et al. |
| 7,747,778 B1 | 6/2010 | King |
| 7,748,038 B2 | 6/2010 | Olivier et al. |
| 7,827,607 B2 | 11/2010 | Sobel et al. |
| D630,645 S | 1/2011 | Tokunaga |
| 7,971,252 B2 | 6/2011 | Lippmann et al. |
| 8,000,698 B2 | 8/2011 | Wolman et al. |
| D652,048 S | 1/2012 | Joseph |
| D667,022 S | 9/2012 | LoBosco |
| 8,370,933 B1 | 2/2013 | Buckler |
| 8,429,630 B2 | 4/2013 | Nickolov et al. |
| D682,287 S | 5/2013 | Cong |
| D688,260 S | 8/2013 | Pearcy |
| 8,504,556 B1 | 8/2013 | Rice et al. |
| 8,505,094 B1 | 8/2013 | Xuewen et al. |
| D691,164 S | 10/2013 | Lim |
| D694,252 S | 11/2013 | Helm |
| D694,253 S | 11/2013 | Helm |
| 8,584,233 B1 | 11/2013 | Yang et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,752,183 B1 | 6/2014 | Heiderich et al. |
| 8,775,402 B2 | 7/2014 | Baskerville et al. |
| 8,825,662 B1 | 9/2014 | Kingman et al. |
| 8,949,988 B2 | 2/2015 | Adams et al. |
| 8,966,639 B1 | 2/2015 | Roytman et al. |
| D730,918 S | 6/2015 | Park |
| 9,053,210 B2 | 6/2015 | Elnikety |
| 9,075,990 B1 | 7/2015 | Yang |
| D740,847 S | 10/2015 | Yampolskiy et al. |
| D740,848 S | 10/2015 | Bolts |
| D741,351 S | 10/2015 | Kito |
| D746,832 S | 1/2016 | Pearcy |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park |
| D754,696 S | 4/2016 | Follett |
| D756,371 S | 5/2016 | Bertnick |
| D756,372 S | 5/2016 | Bertnick |
| D756,392 S | 5/2016 | Yun |
| D759,084 S | 6/2016 | Yampolskiy et al. |
| D759,689 S | 6/2016 | Olson |
| 9,372,994 B1 | 6/2016 | Yampolskiy et al. |
| 9,373,144 B1 | 6/2016 | Ng et al. |
| D760,782 S | 7/2016 | Kendler |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,420,049 B1 | 8/2016 | Talmor et al. |
| 9,424,333 B1 | 8/2016 | Bisignani |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo |
| D775,635 S | 1/2017 | Raji |
| D776,136 S | 1/2017 | Chen |
| D776,153 S | 1/2017 | Yampolskiy et al. |
| D777,177 S | 1/2017 | Chen |
| 9,560,072 B1 | 1/2017 | Xu |
| D778,927 S | 2/2017 | Bertnick |
| D778,928 S | 2/2017 | Bertnick |
| D779,512 S | 2/2017 | Kimura |
| D779,514 S | 2/2017 | Baris |
| D779,531 S | 2/2017 | List |
| D780,770 S | 3/2017 | Sum |
| D785,009 S | 4/2017 | Lim |
| D785,010 S | 4/2017 | Bachman |
| D785,016 S | 4/2017 | Berwick |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne |
| D789,947 S | 6/2017 | Sun |
| D789,957 S | 6/2017 | Wu |
| 9,680,855 B2 | 6/2017 | Schultz et al. |
| 9,680,858 B1 | 6/2017 | Boyer et al. |
| D791,153 S | 7/2017 | Rice |
| D791,834 S | 7/2017 | Eze |
| D792,427 S | 7/2017 | Weaver |
| D795,891 S | 8/2017 | Kohan |
| 9,736,019 B2 | 8/2017 | Hardison et al. |
| D796,523 S | 9/2017 | Bhandari |
| D801,989 S | 11/2017 | Iketsuki |
| D803,237 S | 11/2017 | Wu |
| D804,528 S | 12/2017 | Martin |
| D806,735 S | 1/2018 | Olsen |
| D806,737 S | 1/2018 | Chung |
| D809,523 S | 2/2018 | Lipka |
| D809,989 S | 2/2018 | Lee et al. |
| D812,633 S | 3/2018 | Saneii |
| D814,483 S | 4/2018 | Gavaskar |
| D815,119 S | 4/2018 | Chalker |
| D815,148 S | 4/2018 | Martin |
| D816,105 S | 4/2018 | Rudick |
| D816,116 S | 4/2018 | Selassie |
| 9,954,893 B1 | 4/2018 | Zhao et al. |
| D817,970 S | 5/2018 | Chang |
| D817,977 S | 5/2018 | Kato |
| D818,475 S | 5/2018 | Yepez et al. |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| D847,169 S | 4/2019 | Sombreireiro et al. |
| 10,257,219 B1 | 4/2019 | Geil et al. |
| 10,305,854 B2 | 5/2019 | Alizadeh-Shabdiz et al. |
| 10,331,502 B1 | 6/2019 | Hart |
| 10,339,321 B2 | 7/2019 | Tedeschi |
| 10,339,484 B2 | 7/2019 | Pai et al. |
| 10,348,755 B1 | 7/2019 | Shavell et al. |

(56) References Cited

U.S. PATENT DOCUMENTS

| | | |
|---|---|---|
| 10,412,083 B2 | 9/2019 | Zou et al. |
| D863,335 S | 10/2019 | Hardy et al. |
| D863,345 S | 10/2019 | Hardy et al. |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D872,574 S | 1/2020 | Deylamian et al. |
| 10,540,374 B2 | 1/2020 | Singh et al. |
| D874,506 S | 2/2020 | Kang et al. |
| D880,512 S | 4/2020 | Greenwald et al. |
| D894,939 S | 9/2020 | Braica |
| 10,764,298 B1 | 9/2020 | Light et al. |
| 10,776,483 B2 | 9/2020 | Bagulho Monteiro Pereira |
| 10,796,260 B2 | 10/2020 | Brannon et al. |
| D903,693 S | 12/2020 | Li et al. |
| D905,712 S | 12/2020 | Li et al. |
| D908,139 S | 1/2021 | Hardy et al. |
| 10,896,394 B2 | 1/2021 | Brannon et al. |
| 10,909,488 B2 | 2/2021 | Hecht et al. |
| D918,955 S | 5/2021 | Madden, Jr. et al. |
| D920,343 S | 5/2021 | Bowland |
| D920,353 S | 5/2021 | Boutros et al. |
| D921,031 S | 6/2021 | Tessier et al. |
| D921,662 S | 6/2021 | Giannino et al. |
| D921,674 S | 6/2021 | Kmak et al. |
| D921,677 S | 6/2021 | Kmak et al. |
| D922,397 S | 6/2021 | Modi et al. |
| D924,909 S | 7/2021 | Nasu et al. |
| 2001/0044798 A1 | 11/2001 | Nagral et al. |
| 2002/0083077 A1 | 6/2002 | Vardi |
| 2002/0133365 A1 | 9/2002 | Grey et al. |
| 2002/0164983 A1* | 11/2002 | Raviv .................... H04L 67/16 455/432.1 |
| 2003/0011601 A1 | 1/2003 | Itoh et al. |
| 2003/0050862 A1 | 3/2003 | Bleicken et al. |
| 2003/0074248 A1 | 4/2003 | Braud et al. |
| 2003/0123424 A1 | 7/2003 | Jung |
| 2003/0187967 A1 | 10/2003 | Walsh et al. |
| 2004/0003284 A1 | 1/2004 | Campbell et al. |
| 2004/0010709 A1 | 1/2004 | Baudoin et al. |
| 2004/0024859 A1 | 2/2004 | Bloch et al. |
| 2004/0098375 A1 | 5/2004 | DeCarlo |
| 2004/0133561 A1 | 7/2004 | Burke |
| 2004/0133689 A1 | 7/2004 | Vasisht |
| 2004/0193907 A1 | 9/2004 | Patanella |
| 2004/0193918 A1 | 9/2004 | Green et al. |
| 2004/0199791 A1 | 10/2004 | Poletto et al. |
| 2004/0199792 A1 | 10/2004 | Tan et al. |
| 2004/0221296 A1 | 11/2004 | Ogielski et al. |
| 2004/0250122 A1 | 12/2004 | Newton |
| 2004/0250134 A1 | 12/2004 | Kohler et al. |
| 2005/0065807 A1 | 3/2005 | DeAngelis et al. |
| 2005/0066195 A1 | 3/2005 | Jones |
| 2005/0071450 A1 | 3/2005 | Allen et al. |
| 2005/0076245 A1 | 4/2005 | Graham et al. |
| 2005/0080720 A1 | 4/2005 | Betz et al. |
| 2005/0108415 A1 | 5/2005 | Turk et al. |
| 2005/0131830 A1 | 6/2005 | Juarez et al. |
| 2005/0138413 A1 | 6/2005 | Lippmann et al. |
| 2005/0160002 A1 | 7/2005 | Roetter et al. |
| 2005/0234767 A1 | 10/2005 | Bolzman et al. |
| 2005/0278726 A1 | 12/2005 | Cano |
| 2006/0036335 A1 | 2/2006 | Banter |
| 2006/0107226 A1 | 5/2006 | Matthews |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2006/0271564 A1 | 11/2006 | Meng Muntz et al. |
| 2007/0016948 A1 | 1/2007 | Dubrovsky et al. |
| 2007/0067845 A1 | 3/2007 | Wiemer et al. |
| 2007/0113282 A1 | 5/2007 | Ross |
| 2007/0136622 A1 | 6/2007 | Price et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2008/0270458 A1 | 10/2008 | Gvelesiani |
| 2009/0044272 A1 | 2/2009 | Jarrett |
| 2009/0064337 A1 | 3/2009 | Chien |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1 | 8/2009 | Bouchard et al. |
| 2009/0228830 A1 | 9/2009 | Herz et al. |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin |
| 2010/0114634 A1 | 5/2010 | Christiansen et al. |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0262444 A1 | 10/2010 | Atwal et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2010/0309206 A1 | 12/2010 | Xie et al. |
| 2011/0137704 A1 | 6/2011 | Mitra |
| 2011/0145168 A1 | 6/2011 | Dirnstorfer et al. |
| 2011/0145576 A1 | 6/2011 | Bettan |
| 2011/0148880 A1 | 6/2011 | De Peuter |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0225085 A1 | 9/2011 | Takeshita et al. |
| 2011/0231395 A1 | 9/2011 | Vadlamani |
| 2011/0239300 A1 | 9/2011 | Klein et al. |
| 2011/0249002 A1 | 10/2011 | Duplessis et al. |
| 2011/0282997 A1 | 11/2011 | Prince et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0059823 A1 | 3/2012 | Barber et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser |
| 2012/0221376 A1 | 8/2012 | Austin |
| 2012/0255027 A1 | 10/2012 | Kanakapura et al. |
| 2012/0291129 A1 | 11/2012 | Shulman et al. |
| 2013/0014253 A1 | 1/2013 | Vivian et al. |
| 2013/0055386 A1 | 2/2013 | Kim et al. |
| 2013/0060351 A1 | 3/2013 | Imming et al. |
| 2013/0080505 A1 | 3/2013 | Nielsen et al. |
| 2013/0086521 A1 | 4/2013 | Grossele |
| 2013/0086687 A1 | 4/2013 | Chess et al. |
| 2013/0091574 A1 | 4/2013 | Howes et al. |
| 2013/0124644 A1 | 5/2013 | Hunt et al. |
| 2013/0124653 A1 | 5/2013 | Vick et al. |

(56) References Cited

U.S. PATENT DOCUMENTS

| | | |
|---|---|---|
| 2013/0142050 A1 | 6/2013 | Luna |
| 2013/0173791 A1* | 7/2013 | Longo ............... H04L 29/12056 709/224 |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0263270 A1 | 10/2013 | Cote et al. |
| 2013/0282406 A1 | 10/2013 | Snyder et al. |
| 2013/0291105 A1 | 10/2013 | Zheng |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores |
| 2014/0006129 A1 | 1/2014 | Heath |
| 2014/0019196 A1 | 1/2014 | Wiggins |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137257 A1 | 5/2014 | Martinez et al. |
| 2014/0146370 A1 | 5/2014 | Banner et al. |
| 2014/0173066 A1* | 6/2014 | Newton ................ H04L 65/403 709/221 |
| 2014/0189098 A1 | 7/2014 | MaGill et al. |
| 2014/0204803 A1 | 7/2014 | Nguyen et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1* | 7/2015 | Morin ................ H04L 61/1511 709/245 |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0014081 A1 | 1/2016 | Don, Jr. et al. |
| 2016/0023639 A1 | 1/2016 | Cajiga et al. |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0119373 A1 | 4/2016 | Fausto et al. |
| 2016/0140466 A1 | 5/2016 | Sidebottom |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0241560 A1 | 8/2016 | Reshadi et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0364496 A1 | 12/2016 | Li |
| 2016/0373485 A1 | 12/2016 | Kamble |
| 2017/0048267 A1 | 2/2017 | Yampolskiy et al. |
| 2017/0063901 A1 | 3/2017 | Muddu et al. |
| 2017/0104783 A1 | 4/2017 | Vanunu et al. |
| 2017/0142148 A1 | 5/2017 | Bu Er et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | Athuluru TIrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0279843 A1 | 9/2017 | Schultz et al. |
| 2017/0300911 A1 | 10/2017 | Alnajem |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1 | 11/2017 | Gonzalez |
| 2017/0337487 A1 | 11/2017 | Nock et al. |
| 2018/0013716 A1 | 1/2018 | Connell et al. |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |
| 2018/0123934 A1 | 5/2018 | Gissing et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0285414 A1 | 10/2018 | Kondiles et al. |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0065545 A1 | 2/2019 | Hazel et al. |
| 2019/0079369 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1 | 5/2019 | Steele et al. |
| 2019/0179490 A1 | 6/2019 | Barday et al. |
| 2019/0215331 A1 | 7/2019 | Anakata et al. |
| 2019/0238439 A1* | 8/2019 | Pugh ................... H04L 43/0876 |
| 2019/0297106 A1 | 9/2019 | Geil et al. |
| 2019/0303574 A1 | 10/2019 | Lamay et al. |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0053127 A1 | 2/2020 | Brotherton et al. |
| 2020/0065213 A1 | 2/2020 | Poghosyan et al. |
| 2020/0074084 A1 | 3/2020 | Dorrans et al. |
| 2020/0092172 A1 | 3/2020 | Kumaran et al. |
| 2020/0097845 A1 | 3/2020 | Shaikh et al. |
| 2020/0106798 A1 | 4/2020 | Lin |
| 2020/0125734 A1 | 4/2020 | Light et al. |
| 2020/0183655 A1 | 6/2020 | Barday et al. |
| 2020/0272763 A1 | 8/2020 | Brannon et al. |
| 2020/0285737 A1 | 9/2020 | Kraus et al. |

(56) References Cited

U.S. PATENT DOCUMENTS

2020/0356689 A1    11/2020   McEnroe et al.
2020/0356695 A1    11/2020   Brannon et al.

OTHER PUBLICATIONS

"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Maltego XL," accessed on the Internet at https://www.paterva.com/web7/buy/maltegoclients/maltego-xl.php, 5 pages.
"Master Security Criteria," Version 3.0, BITS Financial Services Security Laboratory, Oct. 2001, 47 pages.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV0SEE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.ll.miLedufpublicationsflabnotesfpluggingtherightho! . . . , 2 pages.
"Rapid7 Nexpose Vulnerability Scanner," accessed on the internet at https://www.rapid7.com/products/nexpose/download/, 3 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Application as filed, pending claims of U.S. Appl. No. 13/240,572 as of Nov. 18, 2015, 45 pages.
Artz, Michael Lyle, "NetSPA: A Network Security Planning Architecture," Massachusetts Institute of Technology, May 24, 2002, 97 pages.
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Carstens, et al., "Modeling Company Risk and Importance in Supply Graphs," European Semantic Web Conference 2017: The Semantic Web pp. 18-31.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph-Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gephi (gephi.org), accessed on the internet at https://web.archive.org/web/20151216223216/https://gephi.org/; Dec. 16, 2015; 1 page.
Gilgur, et al., "Percentile-Based Approach to Forecasting Workload Growth" Proceedings of CMG'15 Performance and Capacity International Conference by the Computer Measurement Group. No. 2015 (Year:2015).
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (Policy). Http://ieeexplore.ieee.org/stamp/stamp.jsp?arnumber=5976796. 8 pages.
Hacking Exposed 6, S. McClure et al., copyright 2009, 37 pages.
Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al., "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.

(56) References Cited

OTHER PUBLICATIONS

Joslyn, et al., "Massive Scale Cyber Traffic Analysis: A Driver for Graph Database Research," Proceedings of the First International Workshop on Graph Data Management Experience and Systems (Grades 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
MaxMind, https://www.maxmind.com/en/about-maxmind, https://www.maxmind.com/en/geoip2-isp-database, date accessed Sep. 28, 20116, 3 pages.
Mcnab, "Network Security Assessment," copyright 2004, 56 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
Pending claims for U.S. Appl. No. 14/021,585, as of Apr. 29, 2016, 2 pages.
Pending claims for U.S. Appl. No. 14/021,585, as of Nov. 18, 2015, 6 pages.
U.S. Appl. No. 13/240,572 and pending claims as of Mar. 22, 2016, 10 pages.
U.S. Appl. No. 13/240,572 as of Oct. 7, 2015, application as filed and pending claims, 45 pages.
U.S. Appl. No. 14/021,585 and pending claims as of Mar. 22, 2016, 2 pages.
U.S. Appl. No. 14/021,585 as of Oct. 7, 2015 and application as filed, 70 pages.
U.S. Appl. No. 14/944,484 and pending claims as of Mar. 22, 2016, 4 pages.
U.S. Appl. No. 61/386,156 as of Oct. 7, 2015. 2 pages.
Application as filed and pending claims for U.S. Appl. No. 13/240,572 as of Apr. 29, 2016, 46 pages.
Application as filed and pending claims for U.S. Appl. No. 14/944,484 as of Apr. 29, 2016, 4 pages.
Paxson, Vern, "How The Pursuit of Truth Led Me To Selling Viagra," EECS Department, University of California, International Computer Science Institute, Lawrence Berkeley National Laboratory, Aug. 13, 2009, 68 pages.
Proposal and Award Policies and Procedures Guide, Part 1—Proposal Preparation & Submission Guidelines GPG, The National Science Foundation, Feb. 2009, 68 pages.
Provos et al., "The Ghost In the Browser Analysis of Web-based Malware", 2007 (9 pages).
Rare Events, Oct. 2009, Jason, The Mitre Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.eom/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics v1.0.0, The Center for Internet Security, May 11, 2009, 90 pages.
The Dun & Bradstreet Corp. Stock Report, Standard & Poor's, Jun. 6, 2009, 8 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Search Query Report form IP.com (performed Apr. 27, 2020).
Camelo et al., "Condenser: A Graph-Based Approach for Detecting Botnets," AnubisNetworks R&D, Amadora, Portugal, 8 pages.
Camelo, "Botnet Cluster Identification," Sep. 2014, 2 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber= 1258471 (Year: 2003).

(56) References Cited

OTHER PUBLICATIONS

Seigneur et al., A Survey of Trust and Risk Metrics for a BYOD Mobile Worker World: Third International Conference on Social Eco-Informatics, 2013, 11 pages.
U.S. Appl. No. 17/025,930 Published as: US 2021-0006581 A1, Methods for Using Organizational Behavior for Risk Ratings, Sep. 18, 2020.
U.S. Appl. No. 13/240,572 U.S. Pat. No. 10,805,331 Published as: US2016/0205126, Information Technology Security Assessment System, Sep. 22, 2011.
U.S. Appl. No. 17/146,064, Methods for Mapping IP Addresses and Domains to Organizations Using User Activity Data, Jan. 11, 2021.
U.S. Appl. No. 15/918,286 U.S. Pat. No. 10,247,219, Correlated Risk in Cybersecurity, Mar. 12, 2018.
U.S. Appl. No. 16/292,956 U.S. Pat. No. 10,594,723, Correlated Risk in Cybersecurity, May 5, 2019.
U.S. Appl. No. 16/795,056 U.S. Pat. No. 10,931,705 Published as: 2020-0195681 A1, Correlated Risk in Cybersecurity, Feb. 19, 2020.
U.S. Appl. No. 16/688,647 U.S. Pat. No. 10,776,483 Published as: US 2020-0134174 A1, Systems and Methods for Remote Detection of Software Through Browser Webinjects, Nov. 19, 2019.
U.S. Appl. No. 15/954,921 U.S. Pat. No. 10,812,520 Published as: US 2019-0319979 A1, Systems and Methods for External Detection of Misconfigured Systems, Apr. 17, 2018.
U.S. Appl. No. 17/014,495 Published as: US 2020-0404017 A1, Systems and Methods for External Detection of Misconfigured Systems, Sep. 8, 2020.
U.S. Appl. No. 16/549,764, Systems and Methods for Inferring Entity Relationships Via Network Communications of Users or User Devices, Aug. 23, 2019.
U.S. Appl. No. 16/360,641, Systems and Methods for Forecasting Cybersecurity Ratings Based on Event-Rate Scenarios, Mar. 21, 2019.
U.S. Appl. No. 29/677,306, Computer Display With Corporate Hierarchy Graphical User Interface Computer Display With Corporate Hierarchy Graphical User Interface, Jan. 18, 2019.
U.S. Appl. No. 16/779,437 U.S. Pat. No. 10,791,140, Systems and Methods for Rapidly Producing Security Ratings, Jan. 31, 2020.
U.S. Appl. No. 17/039,675 U.S. Pat. No. 10,893,067, Systems and Methods for Rapidly Generating Security Ratings, Jan. 31, 2020.
U.S. Appl. No. 17/119,822, Systems and Methods for Cybersecurity Risk Mitigation and Management, Dec. 11, 2020.
U.S. Appl. No. 16/942,452, Systems and Methods for Improving a Security Profile of an Entity Based on Peer Security Profiles, Jul. 29, 2020.
U.S. Appl. No. 29/736,641, Computer Display With Peer Analytics Graphical User Interface, Jun. 2, 2020.
U.S. Appl. No. 17/039,675, Systems and Methods for Determining Asset Importance in Security Risk Management, Sep. 30, 2020.
U.S. Appl. No. 15/271,655, the Office Actions dated Feb. 21, 2017 and Aug. 18, 2017.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, now U.S. Pat. No. 10,326,786, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. No. 10,341,370, the Office Action dated Mar. 21, 2018 and the Notice of Allowance dated Jan. 14, 2019.
U.S. Appl. No. 16/405,121, the Office Action dated Aug. 1, 2019 and Nov. 21, 2019.
U.S. Appl. No. 13/240,572, the Office Actions dated Nov. 21, 2013, Jun. 16, 2014, Feb. 27, 2015, Jun. 3, 2015, Oct. 26, 2015, Mar. 10, 2016 Feb. 13, 2017 and the Notice of Allowance dated Jun. 1, 2020.
U.S. Appl. No. 14/944,484, now U.S. Pat. No. 9,973,524, the Office Actions dated Mar. 11, 2016, Jul. 5, 2016, and Jan. 17, 2017 and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Action dated Jul. 8, 2019, Feb. 21, 2020, and Sep. 30, 2020.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D. 835,631, the Notice of Allowance dated Aug. 15, 2018.
U.S. Appl. No. 29/598,299, now U.S. Pat. No. D. 818,475, the Notice of Allowance dated Jan. 2, 2018.
U.S. Appl. No. 29/599,622, now U.S. Pat. No. D. 847,169, the Notice of Allowance dated Dec. 11, 2018.
U.S. Appl. No. 29/599,620, now U.S. Pat. No. D. 846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 16/738,825, the Office Actions dated Jul. 8, 2019 and Feb. 21, 2020.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notices of Allowance dated Jan. 8, 2020 and Jan. 27, 2020.
U.S. Appl. No. 16/795,056, the Office Action dated May 1, 2020.
U.S. Appl. No. 16/170,680, the Office Action dated Mar. 26, 2019; the Notices of Allowance dated Oct. 29, 2019 and Aug. 27, 2019.
U.S. Appl. No. 16/688,647, the Office Action dated Jan. 29, 2020; the Notice of Allowance dated May 12, 2020.
U.S. Appl. No. 17/000,135, the Office Action dated Feb. 2, 2021.
U.S. Appl. No. 15/954,921, the Office Actions dated Sep. 4, 2018, Jan. 3, 2019, Aug. 19, 2019, and Dec. 5, 2019; Advisory Action dated Mar. 3, 2020.
U.S. Appl. No. 16/787,650, the Notice of Allowance dated Apr. 7, 2020.
U.S. Appl. No. 16/583,991, the Office Action dated Jan. 13, 2020.
U.S. Appl. No. 29/666,942, the Notice of Allowance dated Apr. 30, 2020.
U.S. Appl. No. 16/360,641, the Office Action dated Aug. 7, 2019, Feb. 20, 2020 and Sep. 4, 2020.
U.S. Appl. No. 16/514,771, the Office Action dated Dec. 4, 2019; the Notice of Allowance dated Mar. 18, 2020.
U.S. Appl. No. 16/922,673, the Office Action dated Jan. 22, 2021.
U.S. Appl. No. 16/775,840, the Notice of Allowance dated May 19, 2020.
U.S. Appl. No. 16/779,437, the Notices of Allowance dated Aug. 12, 2020, Oct. 26, 2020 and Nov. 9, 2020.
U.S. Appl. No. 16/802,232, the Notice of Allowance dated Apr. 24, 2020.
U.S. Appl. No. 16/942,452, the Office Action dated Oct. 23, 2020.
U.S. Appl. No. 17/039,675, the Notice of Allowance dated Feb. 3, 2021.
U.S. Appl. No. 16/884,607, the Office Action dated Jan. 25, 2021.
U.S. Appl. No. 15/271,655 Published as: US2018/0083999, Self-Published Security Risk Management, Sep. 21, 2016.
U.S. Appl. No. 17/069,151, Information Technology Security Assessment System, Oct. 13, 2020.
U.S. Appl. No. 29/599,622, Computer Display With Security Ratings Graphical User Interface, Apr. 5, 2017.
U.S. Appl. No. 29/599,620, Computer Display With Security Ratings Graphical User Interface, Apr. 5, 2017.

(56) References Cited

OTHER PUBLICATIONS

U.S. Appl. No. 16/015,686, Methods for Mapping IP Addresses and Domains to Organizations Using User Activity Data, Jun. 22, 2018.
U.S. Appl. No. 16/543,075, Methods for Mapping IP Addresses and Domains to Organizations Using User Activity Data, Aug. 16, 2019.
U.S. Appl. No. 16/738,825, Methods for Mapping IP Addresses and Domains to Organizations Using User Activity Data, Jan. 9, 2020.
U.S. Appl. No. 15/918,286, Correlated Risk in Cybersecurity, Mar. 12, 2018.
U.S. Appl. No. 16/292,956, Correlated Risk in Cybersecurity, May 5, 2019.
U.S. Appl. No. 16/795,056, Correlated Risk in Cybersecurity, Feb. 19, 2020.
U.S. Appl. No. 17/179,630, Correlated Risk in Cybersecurity, Feb. 19, 2021.
U.S. Appl. No. 16/170,680, Systems and Methods for Remote Detection of Software Through Browser Webinjects, Oct. 25, 2018.
U.S. Appl. No. 16/688,647, Systems and Methods for Remote Detection of Software Through Browser Webinjects, Nov. 19, 2019.
U.S. Appl. No. 17/000,135, Systems and Methods for Remote Detection of Software Through Browser Webinjects, Aug. 21, 2020.
U.S. Appl. No. 15/954,921, Systems and Methods for External Detection of Misconfigured Systems, Apr. 17, 2018.
U.S. Appl. No. 17/014,495, Systems and Methods for External Detection of Misconfigured Systems, Sep. 8, 2020.
U.S. Appl. No. 16/787,650, Systems and Methods for Inferring Entity Relationships Via Network Communications of Users or User Devices, Feb. 11, 2020.
U.S. Appl. No. 16/583,991, Systems and Methods for Network Asset Discovery and Association Thereof With Entities, Sep. 26, 2019.
U.S. Appl. No. 17/085,550, Systems and Methods for Network Asset Discovery and Association Thereof With Entities, Oct. 30, 2020.
U.S. Appl. No. 29/666,942, Computer Display With Graphical User Interface, Oct. 17, 2018.
U.S. Appl. No. 16/514,771, Systems and Methods for Generating Security Improvement Plans for Entities, Jul. 17, 2019.
U.S. Appl. No. 16/922,672, Systems and Methods for Generating Security Improvement Plans for Entities, Jul. 7, 2020.
U.S. Appl. No. 17/307,577, Systems and Methods for Generating Security Improvement Plans for Entities, May 4, 2021.
U.S. Appl. No. 16/775,840, Systems and Methods for Assessing Cybersecurity State of Entities Based on Computer Network Characterization, Jan. 29, 2020.
U.S. Appl. No. 17/018,587, Systems and Methods for Assessing Cybersecurity State of Entities Based on Computer Network Characterization, Sep. 11, 2020.
U.S. Appl. No. 17/132,512, Systems and Methods for Rapidly Generating Security Ratings, Dec. 23, 2020.
U.S. Appl. No. 16/779,437, Systems and Methods for Rapidly Generating Security Ratings, Jan. 31, 2020.
U.S. Appl. No. 16/802,232, Systems and Methods for Improving a Security Profile of an Entity Based on Peer Security Profiles, Feb. 26, 2020.
U.S. Appl. No. 17/320,997, Systems and Methods for Determining Asset Importance in Security Risk Management, May 14, 2021.
U.S. Appl. No. 16/884,607, Systems and Methods for Managing Cybersecurity Alerts, May 27, 2020.
U.S. Appl. No. 17/236,594, Systems and Methods for Managing Cybersecurity Alerts, Apr. 21, 2021.
"Mile 2 CPTE Maltego Demo," accessed on the Internet at https://www.youtube.com/watch?v=o2oNKOUzP0U; Jul. 12, 2012; 1 page.
"Palantir Cyber: Uncovering malicious behavior at petabyte scale," accessed on the internet at https://www.youtube.com/watch?v=_EhYezVO6EE; Dec. 21, 2012; 1 page.
"Percentile-Based Approach to Forecasting Workload Growth Proceedings of CMG'15 Performance and Capacity International Conference by the Computer Measurement Group. No. 2015 (Year:2015)."
Camelo, "Botnet Cluster Identification," Sep. 2014, 90 pages.

Dun & Bradstreet Corp. Stock Report, Standard & Poor's, Jun. 6, 2009, 8 pages.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Mcnab, "Network Security Assessment," copyright 2004, 13 pages.
Morningstar Direct, dated to Nov. 12, 202, morningstardirect.com [online]. Retrieved Feb. 26, 2021 from internet <URL:https://web.archive.org/web/20201112021943/https://www.morningstar.com/products/direct> (Year: 2020).
Rees, L. P. et al., "Decision support for cybersecurity risk planning." Decision Support Systems 51.3 (2011): pp. 493-505.
Santos, J. R. et al., "A framework for linking cybersecurity metrics to the modeling of macroeconomic interdependencies." Risk Analysis: An International Journal (2007) 27.5, pp. 1283-1297.
U.S. Appl. No. 15/377,574 U.S. Pat. No. 9,705,932, Methods and Systems for Creating, De-Duplicating, and Accessing Data Using an Object Storage System, Dec. 13, 2016.
U.S. Appl. No. 14/021,585 U.S. Pat. No. 9,438,615 Published as: US2015/0074579, Security Risk Management, Sep. 9, 2013.
U.S. Appl. No. 15/216,955 Published as: US2016/0330231, Methods for Using Organizational Behavior for Risk Ratings, Jul. 22, 2016.
U.S. Appl. No. 15/239,063 Published as: US2017/0093901, Security Risk Management, Aug. 17, 2016.
U.S. Appl. No. 16/405,121 Published as: US2019/0260791, Methods for Using Organizational Behavior for Risk Ratings, May 7, 2019.
U.S. Appl. No. 17/025,930, Methods for Using Organizational Behavior for Risk Ratings, Sep. 18, 2020.
U.S. Appl. No. 13/240,572 Published as: US2016/0205126, Information Technology Security Assessment System, Sep. 22, 2011.
U.S. Appl. No. 14/944,484 U.S. Pat. No. 9,973,524 Published as: US2016/0323308, Information Technology Security Assessment System, Nov. 18, 2015.
U.S. Appl. No. 15/142,677 U.S. Pat. No. 9,830,569 Published as: US/2016/0239772, Security Assessment Using Service Provider Digital Asset Information, Apr. 29, 2016.
U.S. Appl. No. 17/069,151 Published as: US/2021/0211454, Information Technology Security Assessment System, Oct. 13, 2020.
U.S. Appl. No. 15/134,845 U.S. Pat. No. 9,680,858, Annotation Platform for a Security Risk System, Apr. 21, 2016.
U.S. Appl. No. 15/044,952 Published as: US2017/0236077, Relationships Among Technology Assets and Services and the Entities Responsible for Them, Feb. 16, 2016.
U.S. Appl. No. 15/089,375 U.S. Pat. No. 10,176,445 Published as: US2017/0236079, Relationships Among Technology Assets and Services and the Entities Responsible for Them, Apr. 1, 2016.
U.S. Appl. No. 29/598,298 U.S. Pat. No. D. 835,631, Computer Display Screen With Graphical User Interface, Mar. 24, 2017.
U.S. Appl. No. 29/598,299 U.S. Pat. No. D. 818,475, Computer Display With Security Ratings Graphical User Interface, Mar. 24, 2017.
U.S. Appl. No. 29/599,622 U.S. Pat. No. D. 847,169, Computer Display With Security Ratings Graphical User Interface, Apr. 5, 2017.
U.S. Appl. No. 29/599,620 U.S. Pat. No. D. 846,562, Computer Display With Security Ratings Graphical User Interface, Apr. 5, 2017.
U.S. Appl. No. 16/015,686 U.S. Pat. No. 10,425,380, Methods for Mapping IP Addresses and Domains to Organizations Using User Activity Data, Jun. 22, 2018.
U.S. Appl. No. 16/543,075 U.S. Pat. No. 10,554,619, Methods for Mapping IP Addresses and Domains to Organizations Using User Activity Data, Aug. 16, 2019.
U.S. Appl. No. 16/738,825 U.S. Pat. No. 10,893,021, Methods for Mapping IP Addresses and Domains to Organizations Using User Activity Data, Jan. 9, 2020.
U.S. Appl. No. 15/918,286 U.S. Pat. No. 10,257,219, Correlated Risk in Cybersecurity, Mar. 12, 2018.
U.S. Appl. No. 16/292,956 U.S. Pat. No. 10,594,723, Correlated Risk in Cybersecurity, Mar. 5, 2019.

(56) References Cited

OTHER PUBLICATIONS

U.S. Appl. No. 16/795,056 U.S. Pat. No. 10,931,705, Correlated Risk in Cybersecurity, Feb. 19, 2020.
U.S. Appl. No. 17/179,630 Published as: US2021/0176269, Correlated Risk in Cybersecurity, Feb. 19, 2021.
U.S. Appl. No. 16/170,680 U.S. Pat. No. 10,521,583, Systems and Methods for Remote Detection of Software Through Browser Webinjects, Oct. 25, 2018.
U.S. Appl. No. 16/688,647 U.S. Pat. No. 10,776,483, Systems and Methods for Remote Detection of Software Through Browser Webinjects, Nov. 19, 2019.
U.S. Appl. No. 17/000,135 U.S. Pat. No. 11,126,723, Systems and Methods for Remote Detection of Software Through Browser Webinjects, Aug. 21, 2020.
U.S. Appl. No. 17/401,683 Published as US 2021/0374243, Systems and Methods for Remote Detection of Software Through Browser Webinjects, Aug. 13, 2021.
U.S. Appl. No. 15/954,921 U.S. Pat. No. 10,812,520, Systems and Methods for External Detection of Misconfigured Systems, Apr. 17, 2018.
U.S. Appl. No. 17/014,495 Published as: US2020/0404017, Systems and Methods for External Detection of Misconfigured Systems, Sep. 8, 2020.
U.S. Appl. No. 16/549,764 Published as: US2021/0058421, Systems and Methods for Inferring Entity Relationships Via Network Communications of Users or User Devices, Aug. 23, 2019.
U.S. Appl. No. 16/787,650 U.S. Pat. No. 10,749,893, Systems and Methods for Inferring Entity Relationships Via Network Communications of Users or User Devices, Feb. 11, 2020.
U.S. Appl. No. 16/583,991 U.S. Pat. No. 10,848,382, Systems and Methods for Network Asset Discovery and Association Thereof With Entities, Sep. 26, 2019.
U.S. Appl. No. 17/085,550 U.S. Pat. No. 11,329,878, Systems and Methods for Network Asset Discovery and Association Thereof With Entities, Oct. 30, 2020.
U.S. Appl. No. 29/666,942 U.S. Pat. No. D. 892,135, Computer Display With Graphical User Interface, Oct. 17, 2018.
U.S. Appl. No. 16/360,641 U.S. Pat. No. 11,200,323, Systems and Methods for Forecasting Cybersecurity Ratings Based on Event-Rate Scenarios, Mar. 21, 2019.
U.S. Appl. No. 17/523,166 Published as US 2022/0121753, Systems and Methods for Forecasting Cybersecurity Ratings Based on Event-Rate Scenarios, Nov. 10, 2021.
U.S. Appl. No. 16/514,771 U.S. Pat. No. 10,726,136, Systems and Methods for Generating Security Improvement Plans for Entities, Jul. 17, 2019.
U.S. Appl. No. 16/922,673 U.S. Pat. No. 11,030,325, Systems and Methods for Generating Security Improvement Plans for Entities, Jul. 7, 2020.
U.S. Appl. No. 17/307,577 Published as: US2021/0326449, Systems and Methods for Generating Security Improvement Plans for Entities, May 4, 2021.
U.S. Appl. No. 29/677,306 U.S. Pat. No. D. 905,702, Computer Display With Corporate Hierarchy Graphical User Interface, Jan. 18, 2019.
U.S. Appl. No. 16/775,840 U.S. Pat. No. 10,791,140, Systems and Methods for Assessing Cybersecurity State of Entities Based on Computer Network Characterization, Jan. 29, 2020.
U.S. Appl. No. 17/018,587 U.S. Pat. No. 11,050,779, Systems and Methods for Assessing Cybersecurity State of Entities Based on Computer Network Characterization, Sep. 11, 2020.
U.S. Appl. No. 16/779,437 U.S. Pat. No. 10,893,067, Systems and Methods for Rapidly Generating Security Ratings, Jan. 31, 2020.
U.S. Appl. No. 17/132,512 Published as US 2021/0243221, Systems and Methods for Rapidly Generating Security Ratings, Dec. 23, 2020.
U.S. Appl. No. 17/119,822 U.S. Pat. No. 11,122,073, Systems and Methods for Cybersecurity Risk Mitigation and Management, Dec. 11, 2020.
U.S. Appl. No. 29/815,855, Computer Display With a Graphical User Interface for Cybersecurity Risk Management, Nov. 17, 2021.
U.S. Appl. No. 17/392,521 Published as US 2022/0191232, Systems and Methods for Cybersecurity Risk Mitigation and Management, Aug. 3, 2021.
U.S. Appl. No. 16/802,232 U.S. Pat. No. 10,764,298, Systems and Methods for Improving a Security Profile of an Entity Based on Peer Security Profiles, Feb. 26, 2020.
U.S. Appl. No. 16/942,452 U.S. Pat. No. 11,265,330, Systems and Methods for Improving a Security Profile of an Entity Based on Peer Security Profiles, Jul. 29, 2020.
U.S. Appl. No. 29/725,724, Computer Display With Risk Vectors Graphical User Interface, Feb. 26, 2020.
U.S. Appl. No. 29/736,641 U.S. Pat. No. D. 937,870, Computer Display With Peer Analytics Graphical User Interface, Jun. 2, 2020.
U.S. Appl. No. 17/039,675 U.S. Pat. No. 11,032,244, Systems and Methods for Determining Asset Importance in Security Risk Management, Sep. 30, 2020.
U.S. Appl. No. 17/320,997 Published as US 2021/0344647, Systems and Methods for Determining Asset Importance in Security Risk Management, May 14, 2021.
U.S. Appl. No. 16/884,607 U.S. Pat. No. 11,023,585, Systems and Methods for Managing Cybersecurity Alerts, May 27, 2020.
U.S. Appl. No. 17/236,594 Published as US 2021/0374246, Systems and Methods for Managing Cybersecurity Alerts, Apr. 21, 2021.
U.S. Appl. No. 17/710,168, Systems and Methods for Assessing Cybersecurity Risk in a Work From Home Environment, Mar. 31, 2022.
U.S. Appl. No. 17/945,337, Systems and Methods for Precomputation of Digital Asset Inventories, Sep. 15, 2022.
U.S. Appl. No. 17/856,217, Systems and Methods for Accelerating Cybersecurity Assessments, Jul. 1, 2022.
Chernyshev, M. et al., "On 802.11 Access Point Locatability and Named Entity Recognition in Service Set Identifiers", IEEE Trans. on Info. and Sec., vol. 11 No. 3 (Mar. 2016).
Search Query Report from IP.com (performed Jul. 29, 2022).
Winship, C., "Models for sample selection bias", Annual review of sociology, 18(1) (Aug. 1992), pp. 327-350.

\* cited by examiner

METHODS FOR MAPPING IP ADDRESSES AND DOMAINS TO ORGANIZATIONS USING USER ACTIVITY DATA

CROSS-REFERENCE TO RELATED APPLICATIONS

The present application is a continuation of U.S. patent application Ser. No. 16/738,825 filed Jan. 9, 2020 and titled "Methods for mapping IP addresses and domains to organizations using user activity date," which is a continuation of U.S. patent application Ser. No. 16/543,075 filed Aug. 16, 2019 and titled "Methods for mapping IP addresses and domains to organizations using user activity data," which is a continuation of U.S. patent application Ser. No. 16/015,686 filed Jun. 22, 2018 and titled "Methods for mapping IP addresses and domains to organizations using user activity data," which claims priority to U.S. Provisional Application No. 62/523,416 filed Jun. 22, 2017 and titled "Method for mapping IP addresses and domains to organizations using user activity data," the entireties of which are incorporated herein by reference.

TECHNICAL FIELD

The following disclosure is directed to methods and systems for mapping Internet Protocol (IP) addresses and domain names to organizations and, more specifically, methods and systems for mapping IP addresses and/or domain names to organizations based on user activity data.

BACKGROUND

Large organizations, such as companies, which may have a significant number of users and network assets may wish to know and/or manage IP addresses and/or domain names that are associated with their organizations or brand. This can be particularly true of large conglomerates having multiple subsidiary companies. For example, larger companies can be more subject to cyberattacks and typically have less knowledge of the extent of their network footprint as compared to smaller companies. By knowing more about the characteristics of their networks, they can address security vulnerabilities and better protect themselves from cyberattacks. Due to a large number of users in their systems, including guest and temporary users, there is a need for efficient discovery and management of network (and sub-network) resources associated with the organizations.

SUMMARY

The exemplary methods and systems described herein can discover, filter, and manage IP addresses and/or domain names that belong to organizations or companies by unifying user-associated domain name information of an email address with the observed IP address of that user's activity. In some cases, by applying machine learning techniques and a series of quality filters, and/or using a reference to discover the owner of either the domain or IP address, the exemplary mapping systems can assign the undiscovered resource to the organization. For instances when the IP addresses and domains are already known to belong to a particular organization's network, this information can be used to understand characteristics of that network.

In a first aspect of the disclosure, a computer-implemented method is provided for mapping Internet Protocol (IP) addresses and domain names to organizations. The method includes receiving, by a mapping system from an data provider, a dataset related to users of the data provider. The dataset includes (a) an IP address for a user device of each of the users, and (b) a domain name for a user account of each of the users; enriching, by an analytics engine of the mapping system, the received dataset with enrichment data from an enrichment source; receiving, by the analytics engine from a storage medium, historical data relevant to the enriched dataset; and mapping, by the analytics engine, (i) the IP address and/or (ii) the domain name of each user of some or all of the users to an organization based on the enriched dataset and the historical data.

Embodiments of the method can include one or more of the following features. The data provider can be an email service provider and the users are email users that send or receive email through the email service provider. The enriching, by the analytics engine of the mapping system, the received dataset with enrichment data from the enrichment source can further include determining whether a domain of the email service provider is a free or paid email service provider domain and adding information related to the determined domain to the received dataset; and/or determining whether a network of an IP address of the email user is of a cellular network or a guest network and adding information related to the determined network to the received dataset.

The data provider can be a messaging service provider and the users are messaging users that send or receive messages through the messaging service provider. The data provider can be a website that requires registration for use of the website by the users. The data provider can be a cryptography-related service that provides at least one of the IP address or domain name of each of the users. The historical data can include at least one of previously mapped IP addresses or previously mapped domain names of some or all of the users to the organization. The method can further include normalizing, by a collector of the mapping system, the received dataset.

Normalizing the received data can further include: (i) checking integrity of the dataset; (ii) reformatting some or all of the dataset; (iii) removing duplicates in the dataset; and/or (iv) removing irrelevant data from the dataset. The method can further include storing, by the storage medium, the normalized dataset before enriching by the analytics engine; and receiving, by the analytics engine, the normalized dataset from the storage medium.

The method can further include receiving, by the analytics engine from an entity management system, information about existing associations of organizations to IP addresses and domain names; and mapping, by the analytics engine, the IP address and/or the domain name of some or all of the email users to the organization based on the information about existing associations. The method can further include storing, by the storage medium, the enriched data from the analytics engine. The historical data can include a greater number of data points over time than data points of the dataset. The method can further include applying a predictive model of the mapping system to the processed dataset and the historical data, and/or applying deterministic rules to the processed dataset and the historical data. The method can further include processing, by the predictive model, two or more datasets over a time period, the two or more datasets including data related to a common set of users of the users; determining, by the predictive engine, whether the IP address of some or all of the common set of users are consistent over the time period; and mapping, by the mapping system, the IP address of each of some or all of the common set of users to the organization based on the determination. The deterministic rules can include a minimum number of unique mailboxes associated with an IP address. The method can further include mapping, by the mapping system, the IP address to the organization based whether one or more received datasets have the minimum or greater number of unique mailboxes associated with the IP address.

The dataset is a first dataset and the email users is a first set of email users, the method further includes receiving, by the analytics engine, a second dataset associated with a second set of email users, the second set of email users mutually non-exclusive with the first set of email users; comparing, by the analytics engine, the second dataset to the first dataset, and terminating, by the analytics engine, one or more existing mappings between the IP address and/or the domain name and the organization based on the comparison. The terminating, by the analytics engine, one or more existing mappings can be based on a threshold. The method can include storing, by the storage medium, the mapping of the IP address and/or domain name to the organization.

DETAILED DESCRIPTION

Overview of Exemplary Mapping System and Method

Figure 1:
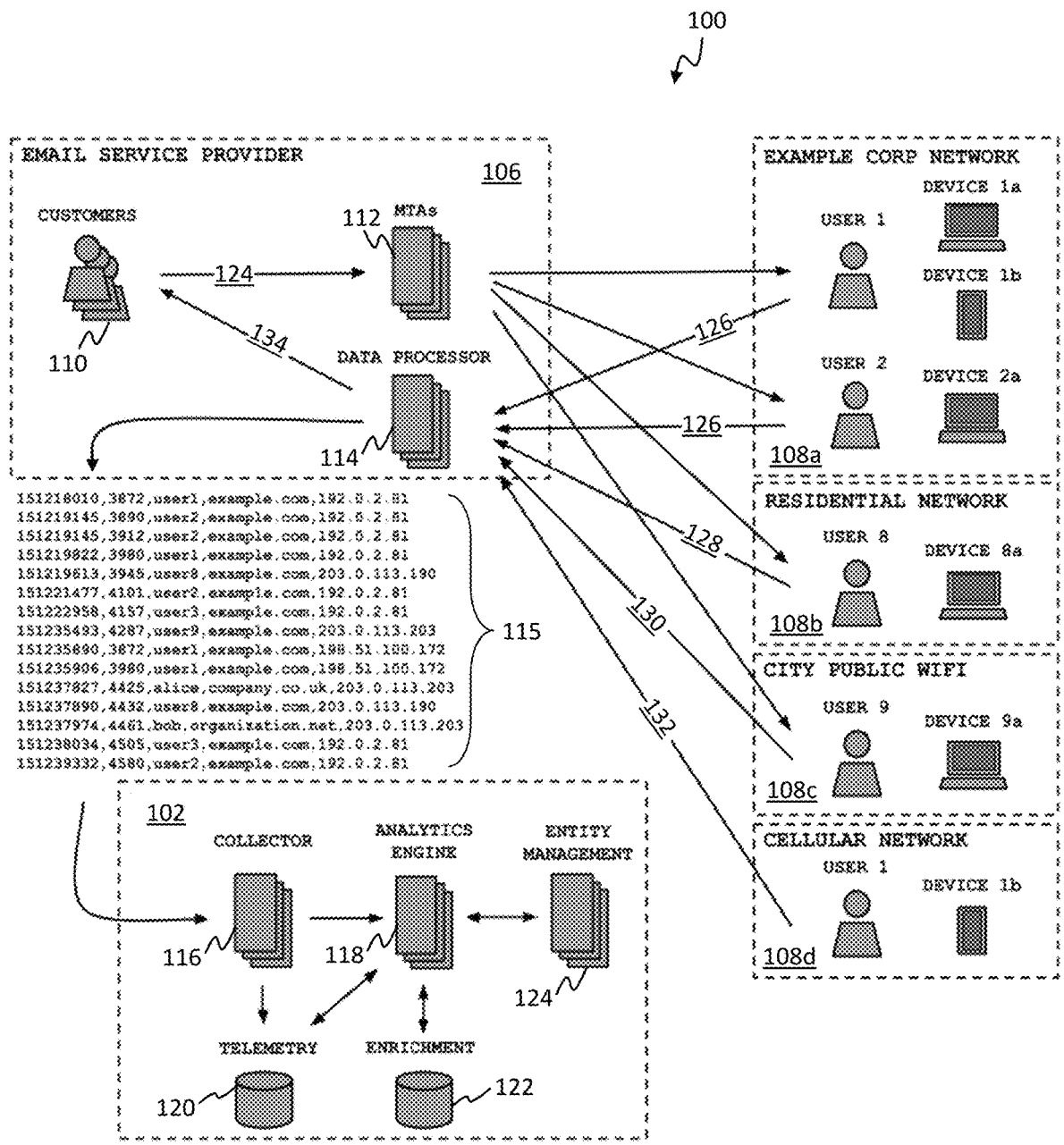
FIG. 1 is a diagram of a network including an exemplary system for mapping IP addresses and/or domain names to organizations using user activity data.

FIG. 1 is a diagram of a network 100 including an exemplary system 102 for mapping IP addresses and/or domain names to organizations using user activity data. Organizations can include companies, businesses, not-for-profit organizations, groups, government entities, schools, etc. Mapping system 102 is illustrated as part of a network 100 that includes a data source 106 (e.g., an email service provider, website, etc.) and various user networks 108a-108d from which the data is drawn. These exemplary user networks 108a-108d can include a corporate network 108a, residential network 108b, public network 108c, and a cellular network 108d. User networks may include semi-public networks (such as networks with passwords provided to guests of a café or hotel), virtual networks, etc. For the purposes of illustrating networks 108a-108d, one or more representative users and one or more devices are shown for each network. Activity data from some or all of these users are collected by the email service provider 106, which can include its customers 110 that send email to users of the various networks 108a-108d via one or more mail transfer agents (MTAs) or one or more email servers 112. The provider 106 includes a data processor 114 that processes incoming email from users in networks 108a-108d. Additionally, the data processor 114 outputs one or more datasets 115 used by the mapping system 102.

The mapping system 102 includes collector 116 coupled to analytics engine 118 and storage 120. Analytics engine 118 is coupled to storage 120, and, optionally, enrichment module 122 and entity management system 124. Each of the foregoing systems and data are described in greater detail below.

Data Sources

The exemplary methods and systems described herein are adapted to receive and process one or more datasets that provide an association between (1) an identifier (e.g., the domain component of a user's email address) that identifies an organization (e.g., a business, a school, a group, etc.) and (2) the IP address that is (a) assigned to the user's computer, device, or terminal, (b) assigned to an intermediary server that the user is implicitly or explicitly accessing and/or using, and/or (c) is the address that external third-parties would consider to be the user's IP address.

Examples of datasets containing information about these associations include, but are not limited to, the following.

Web-based user activity. In some embodiments, datasets used by system 102 for mapping IP addresses and/or domains to organizations can include web-based user activity. For example, in some instances, websites request registration to access and use personal accounts on the site. One component of web-based user account information is the user's email address. When a user logs into these websites, or accesses the websites if already logged in, the website can determine the IP address of the user is associated to the user account, and thus subsequently the user's email address. In some embodiments, the methods and systems described herein may not depend on a domain name to associate with the organization if data originates from a service that has already performed that matching or whose business model revolves around providing a service to employees of a business. For example, web applications offer a service to the employees of the organization, and only those employees or those affiliated with the organization use the product of a particular web application. In this case, since the business organization is known, a domain component is not required, and the resulting pairs may be metadata about that customer and the IP addresses observed using that service.

Email readability user activity. In some embodiments, datasets used by system 102 for mapping IP addresses and/or domains to organizations can include email readability user activity. Email service providers, especially those offering email marketing services, may offer readability or delivery metrics of emails that their customers send to other users or organizations. This feedback is valuable as it allows for adjustment to email campaigns by third parties to improve their effectiveness. These metrics may use an image or other remote resource (henceforth known as "pixel") embedded in the outgoing email that the receiving client fetches when it opens or reads the email. This provides information about the client to the email service provider implying the acknowledgment that the email was opened, thus allowing the email service provider to associate an IP address of the client and the email address of the user. This association can be accomplished in multiple ways. Typically, the email service provider uses its own database to associate the fetching of the pixel (which has a unique name) to a particular email recipient. The provider can receive the IP address(es) of the system that opened the mail and associate the received IP address with system user's email address. The provider can then provide this information (IP address or IP address and domain name) to the mapping system.

Email access user activity. In some embodiments, datasets used by system 102 for mapping IP addresses and/or domains to organizations can include email access user activity. Email service providers may have one or more methods that allow email users to send email through their email service systems destined to other users. Additionally, email service providers may allow their users to fetch their own email from their systems. Much like the previous dataset that focused on telemetry generated by users reading mail sent by a third party. The email service provider may gather the IP address, email address, and associative information by users sending mail (e.g., through a web browser or through the Simple Mail Transfer Protocol (SMTP)), or managing or checking for new mail (e.g., through a web browser, through the Internet Message Access Protocol (IMAP) or through the Post Office Protocol version 3 (POP3)).

Chat-based user activity. In some embodiments, datasets used by system 102 for mapping IP addresses and/or domains to organizations can include chat-based user activity. Instant messaging services (e.g., those that use the Extensible Messaging and Presence Protocol (XMPP)) have user identifiers that are similar in structure and purpose to an email address. Instead of being used as an explicit mailbox, the prefix of the account identifier uniquely identifies the user and, if specified, the user's device. The suffix, or domain, can represent the associative organization that the user's account is managed by and defines how the user can be contacted. If a user is interacting with a particular instant messaging service, such as sending a message or checking to see if messages exist that the client has not yet received, the user implicitly provides its IP address as part of the network transactions.

Cryptography-related user activity. In some embodiments, datasets used by system 102 for mapping IP addresses and/or domains to organizations can include cryptography-related user activity. For example, Pretty Good Privacy (PGP) keys and X.509 certificates are two methods for signing and encrypting email for the purposes of proving authenticity of a user's account or providing privacy protections for messages. These two methods associate their keys or certificates to an email address. These keys may also be used for other purposes, such as signing a message to prove authenticity, or encrypt a file, unrelated to email. If such a message is then posted privately or publicly, the act of the user using this key, which is expected to remain exclusive to this user, and the act of posting it to make it available to one or more users, and thus providing the IP address of the user to the service where it is posted, also provides information used by the system described herein.

In some embodiments, two or more portions of datasets may be used together or merged into one dataset. Specifically, the two or more portions can be merged if they are of the same type. For example, the exemplary system may be able to receive telemetry from two or more email service providers for the "email readability user activity" dataset and be able to join them with little cost to efficiency because, typically, there is a single origin to an email. In another example, for the "email access user activity" dataset, because email is hosted and accessed within the context of one organization or set of email systems, a user is restricted to access his or her email via the specific email portal of the organization (i.e., a user cannot use Yahoo to access his or her Gmail email).

In some embodiments, one or more privacy-enhancing transforms can be applied to the dataset by the data provider and/or the mapping system. These transforms can include, but are not limited to, hashing the mailbox portion of the email address, with or without using a private salt. This transform conceals the actual email addresses from the mapping system, while allowing the mapping system to compute the number of distinct email addresses.

Attributes of Datasets

The attributes of data within a dataset can vary depending on the method used to collect that data. In datasets having email readability user activity, client requests to email service provider readability resources may include a variety of information about the client, such as the client IP address, location information, the mail client or browser user agent, and/or the operating system and version. Other attributes may include any information sent in the Hypertext Transfer Protocol (HTTP) headers, or that may be inferred through fingerprinting techniques commonly used in the industry (e.g., fingerprints based on installed plugins, installed fonts, canvas information, time zone, location setting, etc.). The email service provider may associate the request of the resource back to the original email message, for example, by embedding an identifier in the Uniform Resource Locator (URL) of the remote resource or through other means, which allows the provider to link that client back to the user, and thus also the mailbox, email address, and other metadata already known about the user.

Similar utilization of information is applicable to other types of datasets, such as web-based user activity and cryptography-related used activity, which also rely upon the HTTP protocol to exchange information between the client and server. In the case of chat-based user activity or email access user activity, the information available to a server receiving client requests may be more limited as each of these datasets rely upon other application-layer protocols.

The following are examples of data in the various types of datasets listed above.

For email readability user activity datasets, exemplary datasets from email service providers can include the domain of the email's destination or "TO" email address (e.g. the "example.com" of "user@example.com") and can include/32 IPv4 address or/128 IPv6 address of the client requesting the pixel. Note that, in some instances, this client may not necessarily be the end user's IP address if the user's IP address is hidden (e.g., by a proxy system) by the service provider. Exemplary datasets from email service providers can include the domain of the user's email address and can include/32 IPv4 address or/128 IPv6 address of the client requesting the pixel.

For web-based user activity and email access user activity datasets, exemplary datasets can include the domain of the user's email address of the account and can include/ 32 IPv4 address or/128 IPv6 address of the user accessing the account of the web-based service. Note that if the web-based data provider does not have the user's full email address, it may provide an indication of which user the IP addresses belong to; for example, the provider may provide the administrator's email address, domain of the organization, or other corporation or organization identifier.

For chat-based user activity datasets, exemplary datasets can include the domain of the user's contact address and can include/32 IPv4 address or/128 IPv6 address of the user signing into the chat service provider or sending chat messages.

For cryptography-related used activity datasets, exemplary datasets can include the domain of the email address associated to the cryptographic key(s) and include/32 IPv4 address or/128 IPv6 address of the user posting signed or encrypted content. In some instances, the IP address(es) are associated with the identity of the cryptographic key material. This cryptographic key material can be associated with the user's email address via the enrichment by the mapping system, as described further below.

Exemplary datasets can include a measurement of time indicative of the client request.

In some embodiments, further to collecting data as discussed above, some data of one or more of the datasets can be processed by the data provider as in the following. The below-discussed processing can ensure quality of the output of the analytics engine, as further discussed below.

The exemplary processing can include, in addition to the domain of the email address, a hash of the combination of the destination (or "TO") email address or similar data structure, the IP address of the client request, and a secret salt. This processing permits the disambiguation of multiple users at a company at a specific IP address.

The exemplary processing can include a hash of the combination of an email identifier (for example, a series of alphanumerical characters), the IP address of the client request, and a secret salt. This processing permits the disambiguation of one user repeatedly opening the same email, or multiple people opening the same email, and is specific to the email readability user activity dataset.

The exemplary processing can include a timestamp that can include an hour and minute. This processing permits for greater resolution in the eventual modeling of the data in the datasets.

In some embodiments, additional contextual information about the client can be provided depending on the source dataset. For example, in the case of email readability user activity and web-based user activity, the following additional contextual information can be provided:

HTTP cookie provided by the client which allows for discovering related networks; and/or User-agent (i.e., a software agent acting on behalf of the user) provided by the client that describes characteristics of the user's device.

In some embodiments, any subset of the above-described attributes can be collected as long as the likelihood of false positive results are kept low. For example, an acceptable rate of false positive results is less than or equal to one in five hundred. In some embodiments, the system can associate an IP address or domain to an organization using data directly from the above-described datasets, without relying on extracted attributes.

Exemplary Mapping Methods

Exemplary mapping system 102 is described herein in the context of an example for the purposes of illustrating the functionality of system 102. The examples provided herein are not intended to limit the functionality of the mapping system or steps of the mapping method. The example scenario depicted in FIG. 1 illustrates email being sent by multiple parties to an organization, "Example, Inc.," with the email domain "example.com" with the aim of identifying the IP addresses associated to "Example, Inc." In an exemplary embodiment, once IP address(es) are mapped to an organization, the mapping method described can be repeated such that new domain names are discovered (and, if appropriate, subsequently mapped) from the given IP address(es). Thus, the mapping method works in either direction: given domains, the method can discover IP addresses (for mapping, if appropriate) and given IP addresses, it can discover domains (for mapping, if appropriate). For ease of explanation, the example data and text contains mailbox names and email identifier in plain text.

In the example scenario, customer 110, associated with email service provider 106, sends an email 124 to a user at an organization, the user having the email address "user1@example.com." User 1 is physically present at the offices of company "Example, Inc." and their devices (devices 1a and 1b) are on the organization's network 108a. This email can be initiated manually through the customer's email client (i.e., typed by the customer 110), an automated notification (i.e., an alert), as part of a broader email campaign generated through the email service provider's platform (i.e., marketing campaign), etc. As specified by the customer 110, the email service provider 106 sends the email to the appropriate recipients through one or more MTAs or email servers 112. This email is received by the individual user's email service provider (not shown in FIG. 1) before being delivered into the user's mailbox.

The user (in this example, any one of User 1, 2, 8, and/or 9) is able to access his or her email through any client on any device. For example, the user may be using their web browser to access her email (e.g., Gmail or Yahoo Mail), or the user may be using a dedicated email client (e.g., Apple Mail, Microsoft Outlook, or Thunderbird). The user may be reading their email on a laptop, notebook computer, tablet, mobile device, smartwatch, or any electronic device capable of accessing email. Once the user opens the email, the user may load, via the HTTP protocol, embedded remote resources in the email 124 that can ultimately inform the originating email service provider 106 that the user opened the email. Specifically, this information 126 is sent to and consumed by data processing system 114 at the email service provider 106 that processes and keeps track of qualitative metrics of information 126. These resources may be embedded into content within the email, such as links to remote attachments or advertisements. Telemetry generated by interaction with those resources, such as the user clicking on URLs to access the content, can be processed by the data processor 114 and/or transmitted to the mapping system 102 for processing.

Note that one or more users having devices connected to the same organization's network 108a can be sent email from customer 110. When any of these users (for example, User 1 or 2) opens his or her email, a remote resource is retrieved and information 126 is provided to the data processor 114 at the email service provider 106.

Customer(s) 110 can send email 124 to User 8, at "user8@example.com", who is working remotely from his or her residence. User 8 has device 8a connected to the residence network 108b. When User 8 opens the email 124, the act of doing so causes a remote resource to be retrieved but, instead of including information about the organization's network, it includes information 128 about User 8's present network, which is residential network 108*b*. In some embodiments, information 128 is filtered out the datasets used by the mapping system 102 as the residential networks are not typically of interest for mapping IP addresses and/or domain names to a specific organization (in this example, "Example, Inc.").

Customer(s) 110 can send email 124 to User 9, at "user9@example.com", who is working remotely from a public cafe or park and are connected to the city's public WiFi network 108*c*. When User 9 opens email 124, the act of doing so causes a remote resource to be retrieved and information 130 about the public network 108*c* is obtained by the data processing system 114. In some embodiments, information 130 is filtered out the datasets used by the mapping system 102 as the public networks are not typically of interest for mapping IP addresses and/or domain names to a specific organization (in this example, "Example, Inc.").

In this example scenario, User 1 leaves the Example, Inc.'s office to take a meeting at another location. While on the way to the meeting, User 1 opens previously received email on her mobile device 1*b* connected to a cellular network 108*d*. The act of doing so causes those same remote resources to be retrieved and thus information 132 about the cellular network 108*d* is obtained by the data processing system 114. In some embodiments, information 132 is filtered out the datasets used by the mapping system 102 as cellular networks are not typically of interest for mapping IP addresses and/or domain names to a specific organization (in this example, "Example, Inc.").

In some embodiments, the information received by the data processing system 114 at the email service provider 106 can be processed and provided as quantitative metrics 134 for their customers (#11). In some embodiments, the provider 106 may use metrics 134 for internal benchmarking or, for example, to determine whether its customers may be using its services to spam users. In some cases, the provider 106 may selectively include the remote resource in emails to users for a particular customer and/or in particular circumstances.

In an exemplary embodiment, mapping system 102 receives one or more datasets 115 from the email service provider 106, the datasets 115 having some or all of the attributes described in detail above. In some embodiments, the mapping system 102 receives the datasets 115 in a specific format from the processor 114. The example dataset 115 shows the fields that can include:
    timestamp, email identifier, mailbox name, email domain, IP address
For example, an example entry in the dataset 115 is:
    151218010, 3872, user1, example.com, 192.0.2.81
In some embodiments, there can be other datum in this dataset, including those of users belonging to different organizations accessing email from the public city network.

Figure 3:
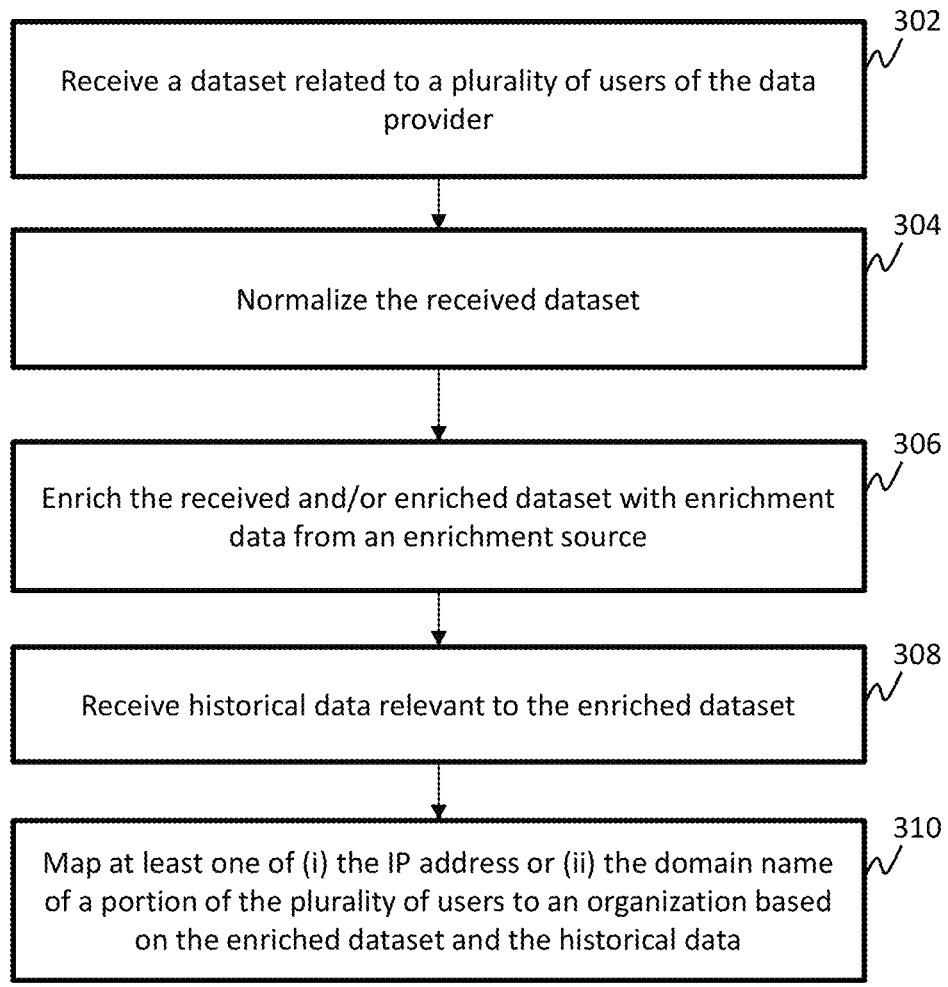
FIG. 3 is a flowchart of an exemplary embodiment of a computer-implemented method for mapping IP addresses and/or domain names to organizations using user activity data.

FIG. 3 is a flowchart of an exemplary method for mapping IP addresses and/or domain names to organizations using user activity data. In exemplary step 302, dataset(s) 115 can be provided by data provider 106 (such as an email service provider, a messaging service provider, a website, and/or a cryptography-related service) directly to the collector 116, or can be fetched from provider 106 by the collector 116. The dataset(s) 115 can include (a) an IP address for a user device of each user of the plurality of users, and/or (b) a domain name a user account of each email user of the plurality of email users. Collector 116 and subsequent downstream processing steps can be configured to operate on data delivered in an stream format (e.g., real-time or as soon as the upstream provider has data to produce) or data in aggregated files at arbitrary intervals. In exemplary step 304, collector 116 may normalize the dataset(s) to perform basic integrity checks on the dataset to ensure, or change to, expected format and size, and perform deduplication, if necessary. For example, collector 116 can be configured to clean datasets having irrelevant information such as the same user opening the same email repeatedly.

In some embodiment, collector 116 passes the normalized dataset(s) into the analytics engine 118 or into a storage medium 120, from which analytics engine 118 can retrieve the normalized dataset(s). Analytics engine 118 may begin by processing the datasets(s) and, in exemplary step 306, begin enriching the dataset(s) with other known information about the domains in the dataset(s) (i.e., whether the domains are free or paid email service provider email domains), or about the IP addresses in the dataset(s) (e.g., whether the IP addresses are cellular networks or if they are known guest or captive portal networks). In some embodiments, analytics engine 118 may engage with an entity management system 124, which stores information about existing associations (obtained from the analytics engine 118 or from another source) of domain names and IP addresses to organizations, to pull in information about known organizations. Analytics engine 118 may store the processed dataset(s) (including any additional information from the entity management system 124) in a storage medium 120. In exemplary step 308, analytics engine 118 may receive or retrieve historical data from storage medium 120 (having existing telemetry) or a caching layer, to provide additional historical context for the information in the datasets. Historical data can include data generated from prior processing of datasets, including any mapping of IP addresses and/or domains to organizations. This can be beneficial because some of the improved data quality attributes are dependent on time-series information larger than the collection period. For example, this is especially helpful for incoming data representing a real-time data stream, while some data quality methods may operate best with at least 24 hours of data for a given association to ensure a full business day has been collected.

In exemplary step 310, analytics engine 118 is configured to map at least one of (i) the IP address or (ii) the domain name of a portion of the plurality of users to an organization based on the enriched dataset and the historical data. Analytics engine 118 is configured to determine a confidence of the assigned IP address and domain name to the organization. Analytics engine 118 is configured to evaluate some or all of the data quality considerations and attributes, by itself or in combination with a developed machine learning model and/or deterministic rules to assess the confidence of a given domain and IP address to a given organization for a specified time period, as described in further detail below. In some embodiments, the analytics engine 118 is configured to assess whether existing associations should be terminated based on any new information that has been collected from incoming dataset(s) 115. The analytics engine 118 can store new associations into the entity management system 124 and can store residual conclusions and existing telemetry back into a storage medium 120. Residual conclusions can include those data that do not meet data quality threshold(s) due to the amount of data collected or due to another measure of quality. Even if the residual conclusions are not used for mapping purposes at a particular time, they may have value for future processing and/or mapping. In some embodiments, the analytics engine 118 can store updated enrichment data to be stored for future and ongoing enrichment activities in the enrichment unit 122. Enrichment can include other known information about the domains in the dataset(s) (i.e., whether the domains are free or paid email service provider email domains), or about the IP addresses in the dataset(s) (e.g., whether the IP addresses are cellular networks or if they are known guest or captive portal networks). Enrichment can also include data about IP address(es) (e.g., geolocation information, whether the address is a guest network, etc.), domain names (e.g., registration information, whether the email service provider is a free or paid service provider, etc.), timestamps (e.g., date, time, seasonal events, holidays in one or more countries, etc.), network characteristics of an IP address of the user (e.g., any present service set identifier (SSID) and basic service set identifier (BSSID), explicit proxies, known workstation and mobile devices, associated IPv4 or IPv6 addresses, domain name system (DNS) records, or data other than the datasets described above under headings "Datasets" and "Attributes of Datasets."

Predictive Modeling of Datasets

Figure 2:
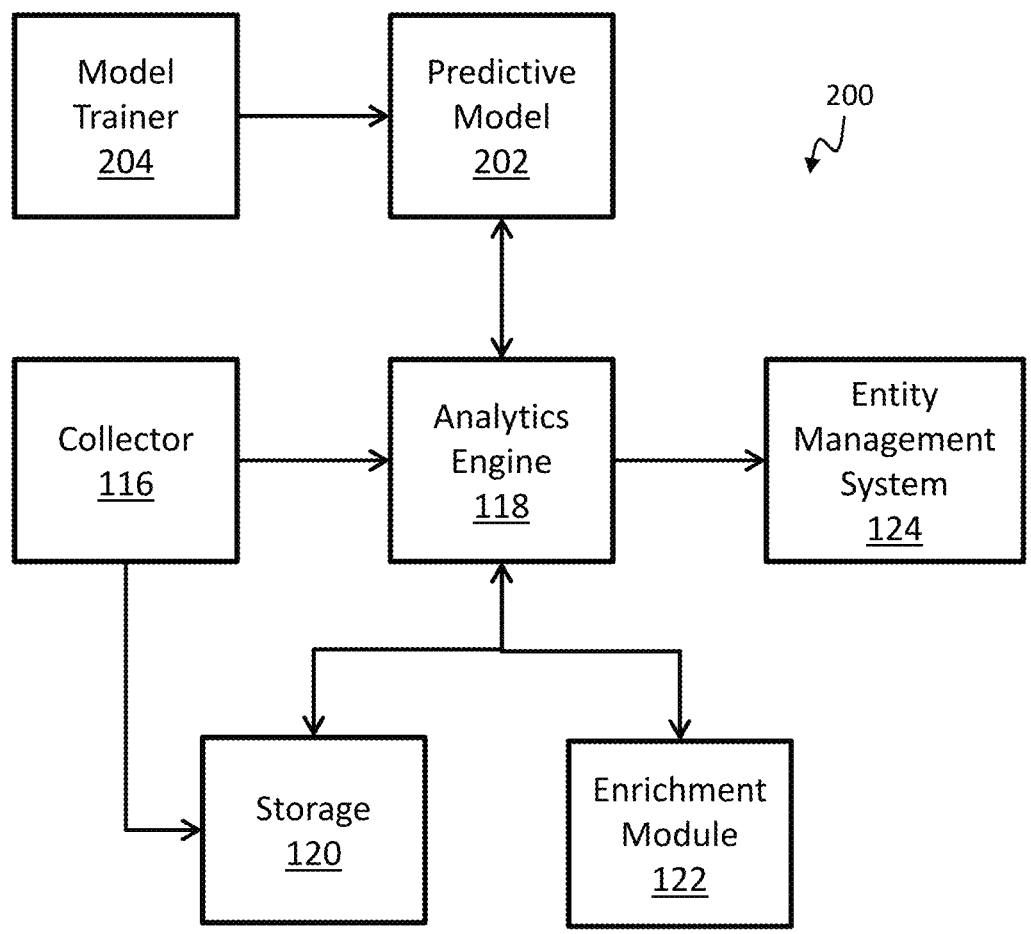
FIG. 2 is a diagram illustrating the mapping system of FIG. 1 interacting with one or more exemplary data sources.

FIG. 2 is a diagram illustrating an exemplary embodiment of a mapping system 200 including a predictive model 202 and model trainer 204. The model trainer 204 may train the predictive model 202 to evaluate the datasets. The predictive model 202 may apply one or more supervised or machine learning techniques to the datasets, such as: support vector machines, classification and regression trees, logistic regression, linear regression and/or another (linear or nonlinear) supervised-learning technique. In some embodiments, one or more of the above-described datasets may be processed by the mapping system 200 using a predictive model 202 (i.e., machine learning techniques) by building a model or classifier that appropriately identifies significantly more reliable results using one or more of the following quality considerations and enrichment strategies. In some embodiments, the model or classifier can join the raw dataset with other metadata. In some embodiments, one or more of the following considerations can be combined with explicit rules which can be manually tuned to enable more deterministic behaviors of the model or classifier. Exemplary considerations include:

Mapping system 200 can normalize mailbox names or user names against suffixes that are added by the user for categorization, device identification, or other purposes before hashing or performing other processing by the exemplary mapping system (e.g., email systems treat "user+bank" and "user+retail" as the same user mailbox, and can be normalized to "user"). This minimizes the instances of the system overestimating the user population.

Mapping system 200 can establish a minimum number of unique mailboxes (i.e., usernames) present on each IP address before associating a given IP address to an organization. For example, this can prevent associating IP addresses or domains to companies due to users who are reading emails away from the office or business location, such as at home or in a coffee shop.

Mapping system 200 can observe the number of unique mailboxes over a continuous period before mapping occurs to a particular organization. This can prevent associating an IP address due to employees traveling to a new location on a temporary basis. However, these IP addresses or domains may still be assigned to a company if these behaviors are to be captured, particularly if the user was an exclusive user of the IP address during this time such as a remote office whose employees are infrequently present.

Mapping system 200 can enrich and/or classify domains under the categories of: (a) organizational, company, or unknown domain names, or (b) domains that are associated to public or private email service providers. Mapping system 200 can monitor domains reported on an IP address. Further, the system can compare addresses (e.g., "mailbox@example.com") to a threshold comparing the number of free or paid email service addresses (e.g., "example1@gmail.com," "example2@hotmail.com," etc.) to the number of addresses at the target domain (e.g., "user@example.com"). Ratios that are excessively high of free or paid email service domains typically imply non-commercial or non-business activities occurring that involves a high number of outsiders with respect to an organization. For example, a high number of outsiders can occur if an organization is hosting a conference, training seminars, etc. Thus, in some embodiments, for a target domain to be considered for mapping to an organization, the target domain ("example.com") should represent at least 40% of the dataset(s) received by the mapping system. In other embodiments, the target domain should represent at least 50%, at least 60%, or more of the dataset(s). In other embodiments, there are cases in which a target domain represents a lower amount (e.g., less than 40%, less than 30%, or less) of the dataset(s) received by the mapping system. For example, there may exist organizations (e.g., manufacturing or warehousing companies) that have a set of employees (e.g., line personnel, factory floor workers, pickers, packers, etc.) that do not utilize their corporate email addresses but do utilize personal email address (e.g., free or paid email service). In such a case, the target domain related to such an company would represent less than what is expected for other organizations, such as one having office workers that frequently utilize their corporate email address.

Mapping system 200 can join one or more other datasets to enrich information about a given IP address that can help improve and increase quality of the outputted association to an organization. For example, another dataset may reveal information about which IP addresses have captive portals present on them, which could identify a possible guest network. If such information exists, then adjustments can be made to rules for assessing an IP address, such as the concentration required for the number of unique mailboxes of a particular domain across all mailboxes observed on that IP address for a certain duration of time.

Mapping system 200 can aggregate multiple domains known to exclusively belong to an organization and treat these domains as one pseudo-domain. For example, an organization using "example.com" and "example.io" as email domains are considered as one domain. Similarly, parent and subsidiary domains may also be aggregated by the system as one pseudo-domain.

Mapping system 200 can monitor unique domains on an IP address for domains that map to organizations other than the target organization. The IP address may be associated with the domain with the highest number of unique mailboxes.

If an IP address is already known to conclusively belong to a particular company or organization, other characteristics of the target network may be inferred. For example, if the lifespan of domain observations on an IP address are brief, or the domains themselves vary, mapping system 200 can determine that the IP address is used as part of an open or shared network, such as those at cafes or hotels, or guest networks within organizations.

Any threshold used by mapping system 200 to determine a candidate association, terminate an existing candidate association, etc., considers the variance within the entire population of events, as the characteristics of these datasets (volume, frequency, etc.) is dependent on the actions of the customers of the email service provider or the users themselves. These actions may depend on real-world events, holidays, promotions, etc. For example, if it is a holiday for an IP address that geolocates to the United States, then there may be a significant variance between telemetry (received dataset(s)) between the days preceding and after the holiday, if, for instance, employees are allowed to take the day off from work on the holiday or observed holiday. As such, no telemetry may be received on the holiday for the given association, which is unusual but understandably expected for a system having context in these scenarios.

In some embodiments, mapping system 200 can use a training dataset that includes one or more elements of the attributes described above to identify a pattern. The system may accept or reject the attribute based on the identified pattern. For example, telemetry from networks known to be public access networks can be trained in a predictive model that can be then used to identify other public access network candidates. These public access network candidates can be treated differently by the mapping system such that they are associated or not associated with a particular organization. Feedback from third parties, such as those organizations to which the IP addresses or domains are being associated can be injected back into the training dataset to allow the feedback to propagate to other organizations. For example, a company could provide information regarding the access characterizations of their network, such as the IP addresses reserved for employee devices, or those IP addresses associated with a sales office of the company. This information can then be used to identify other candidates fitting those attributes belonging to other organizations.

In some embodiments, once a candidate relationship between an IP address and a domain is established, one or more of the following actions may be used to confirm and map the IP or domain to an organization into a security risk management system, such as one described in commonly owned U.S. Pat. No. 9,438,615, issued Sep. 6, 2016 and titled "Security Risk Management," which is incorporated herein in its entirety. The actions by mapping system 200 can include:

If the domain is known to belong to a company within the context of previously identified organization mappings, the domain can be referenced in an existing database that includes domain-to-organization relationships, and the IP address can be added to the map of the one or more organizations returned.

If the IP address is known to belong to an organization within the context of the existing organization map, the IP address can be referenced in the existing database consisting of IP-to-organization relationships, and then the domain could be added to the mapping of the one or more organizations returned.

If neither the domain nor the IP address are known to belong to an organization within the context of the existing company maps, a new company may be initiated and associated with the domain, and the IP address associated to that company.

In other embodiments, the candidate association (IP address or domain) may not be immediately added to an organization map, but continuously monitored for changes or for confidence-building metrics as described earlier.

In some embodiments, once an IP address or domain is associated to an organization, a timestamp can be used to indicate the start of that association, which is known as the "start date." The specific value of the "start date" may depend on the quality metrics described above. In some embodiments, the exemplary system may continuously monitor the dataset(s), thus facilitating continual identification of candidates, including monitoring for candidates that have already been added to the system. In some embodiments, after some period of not observing a candidate data in the received dataset(s) an "end date" can be applied to the candidate data to mark the termination of use of that IP address or domain by that organization. A threshold for the period of inactivity may depend on the organization. For example, for a company, the threshold may depend on the employee count or number of unique mailboxes observed before the company was added to the mapping system.

In embodiments in which the IP address and domain are already known to be associated to an organization, the above-described techniques may reveal attributes about the target networks (that include the organization and users) that may have been previously unknown. For example, the exemplary system can determine whether an IP address is predominantly used as a guest network by assessing the diversity of domains known to belong to other organizations making requests from that IP address.

In some embodiments, even if an organization is not associated with an IP address or domain name, these methods and systems described herein can learn characteristics of those networks or domains. For example, the even or strong presence of free or paid email service provider addresses relative to organization addresses, while the absolute count is relatively low, may reveal that the network is of an individual residence. For example, if the mapping system is able to identify (a) two distinct free or paid email service provider addresses and (b) one or two different addresses belonging to two different organizations, then the network may be considered a residence. The data points belonging to such a network could then subsequently be excluded in future analytic runs to improve efficiency of the exemplary system. In some embodiments, these networks could be labeled as residential and this information can be used as an input to, for example, improve efficiency in processing. Alternatively, a network with very high absolute number of mailbox and domain pairs in which no particular organization domain is prominent, in addition to a high concentration of free or paid email service provider addresses, may reveal a common transit network for a service provider, such as cellular networks or public Virtual Private Network (VPN) provider. This can be function of the number of users on the particular network. For example, an airport that services 10,000 passengers a day, in which 1,000 are connected to the Wi-Fi network may each work at different companies, but may additionally each own a personal email address on a free or paid email service. In this case, the maximum number of addresses for a given target organization domain is one.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 4:
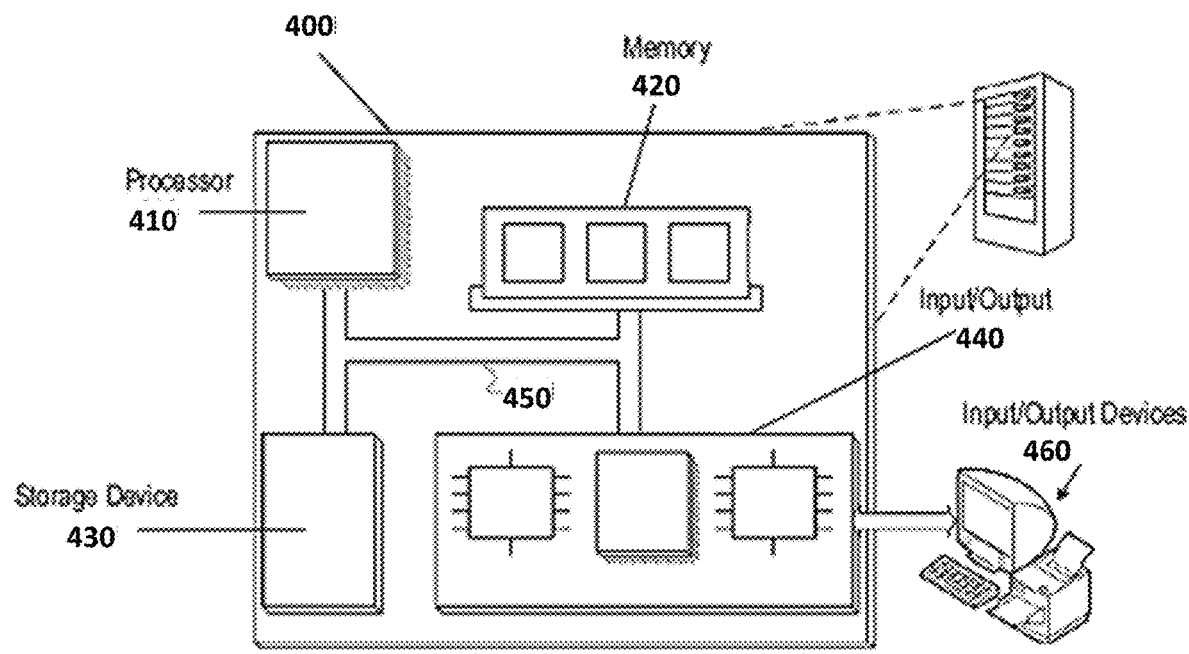
FIG. 4 is a diagram of an example computer system that may be used in implementing the mapping systems and methods described herein.

FIG. 4 is a block diagram of an example computer system 400 that may be used in implementing the technology described in this document. General-purpose computers, network appliances, mobile devices, or other electronic systems may also include at least portions of the system 400. The system 400 includes a processor 410, a memory 420, a storage device 430, and an input/output device 440. Each of the components 410, 420, 430, and 440 may be interconnected, for example, using a system bus 450. The processor 410 is capable of processing instructions for execution within the system 400. In some implementations, the processor 410 is a single-threaded processor. In some implementations, the processor 610 is a multi-threaded processor. The processor 410 is capable of processing instructions stored in the memory 420 or on the storage device 430.

The memory 420 stores information within the system 400. In some implementations, the memory 420 is a non-transitory computer-readable medium. In some implementations, the memory 420 is a volatile memory unit. In some implementations, the memory 420 is a nonvolatile memory unit.

The storage device 430 is capable of providing mass storage for the system 400. In some implementations, the storage device 430 is a non-transitory computer-readable medium. In various different implementations, the storage device 430 may include, for example, a hard disk device, an optical disk device, a solid-date drive, a flash drive, or some other large capacity storage device. For example, the storage device may store long-term data (e.g., database data, file system data, etc.). The input/output device 440 provides input/output operations for the system 400. In some implementations, the input/output device 440 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 460. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 430 may be implemented in a distributed way over a network, such as a server farm or a set of widely distributed servers, or may be implemented in a single computing device.

Although an example processing system has been described in FIG. 4, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method comprising:
   receiving, by a mapping system, a dataset related to a plurality of users and comprising an IP address for a user device of each user of the plurality of users;
   for at least one IP address, determining that a computer network that is associated with the IP address is a residential computer network based on a determination that the computer network is associated with at least a threshold number of IP addresses associated with an email service provider; and
   mapping, by an analytics engine of the mapping system, the IP address of each user of a portion of the plurality of users to an organization, wherein the mapping excludes the at least one IP address associated with the residential computer network.

2. The method of claim 1, wherein, for at least one IP address, determining that the computer network that is associated with the IP address is a residential computer network comprises:
   for each of at least two IP addresses, determining whether the IP address is of a first type or a second type, wherein the first type is an IP address associated with an email service provider and the second type is an IP address associated with an entity; and
   for the at least two IP addresses, when a number of the first type is greater than a number of the second type, determining that the computer network associated with the at least two IP addresses is a residential computer network.

3. The method of claim 1, wherein, for at least one IP address, determining that the computer network that is associated with the IP address is a residential computer network comprises:
   for each of at least four IP addresses, determining whether the IP address is of a first type or a second type, wherein the first type is an IP address associated with an email service provider and the second type is an IP address associated with an entity; and
   for the at least four IP addresses, when:
      (i) the number of the first type is greater than or equal to the number of the second type, and
      (ii) the IP addresses of the second type are each associated with different entities,
      determining that the computer network associated with the at least four IP addresses is a residential computer network.

4. The method of claim 1, wherein the dataset further comprises a domain name for a user account of each user of the plurality of users, and wherein the method further comprises:
   for at least one mapped IP address, determining at least one of: (a) domain name observations are brief on the mapped IP address or (b) domain names vary on the mapped IP address;
   determining that the mapped IP address is associated with an open or shared network.

5. The method of claim 1, further comprising:
   enriching, by the analytics engine of the mapping system, the received dataset with enrichment data from an enrichment source; and
   receiving, by the analytics engine from a storage medium, historical data relevant to the enriched dataset,
   wherein the mapping is based on the enriched dataset and the historical data.

6. The method of claim 5, wherein the dataset is received by the mapping system from a data provider, the data provider being an email service provider and the plurality of users being a plurality of email users that send or receive email through the email service provider.

7. The method of claim 6, wherein enriching, by the analytics engine of the mapping system, the received dataset with enrichment data from the enrichment source further comprises at least one of:
   determining whether a domain of the email service provider is a free or paid email service provider domain and adding information related to the determined domain to the received dataset; or
   determining whether a network of an IP address of the email user is of a cellular network or a guest network and adding information related to the determined network to the received dataset.

8. The method of claim 7, wherein information related to the determined network comprises at least one of: (i) a service set identifier (SSID); (ii) a basic SSID (BSSID); (iii) a proxy, (iv) one or more associated devices; (v) associated IPv4 address or IPv6 address; or (vi) domain name system (DNS) record.

9. The method of claim 5, wherein the historical data includes at least one of previously mapped IP addresses or previously mapped domain names of at least a portion of the plurality of users to the organization.

10. The method of claim 5, further comprising:
applying deterministic rules to the enriched dataset and the historical data, wherein the deterministic rules comprise a minimum number of unique mailboxes associated with an IP address; and
mapping, by the mapping system, the IP address to the organization based whether one or more received datasets have the minimum or greater number of unique mailboxes associated with the IP address.

11. The method of claim 1, wherein the dataset further comprises a domain name for a user account of each user of the plurality of users, and
wherein mapping, by the analytics engine of the mapping system, the IP address of each user of the portion of the plurality of users to the organization comprises:
mapping, by the analytics engine, the domain name of each user of the portion of the plurality of users to the organization.

12. The method of claim 1, further comprising:
normalizing, by a collector of the mapping system, the received dataset.

13. The method of claim 12, wherein normalizing the received dataset further comprises at least one of:
(i) checking integrity of the dataset;
(ii) reformatting a portion of the dataset;
(iii) removing duplicates in the dataset; or
(iv) removing irrelevant data from the dataset.

14. The method of claim 1, further comprising:
receiving, by the analytics engine from an entity management system, information about existing associations of organizations to IP addresses and domain names; and
mapping, by the analytics engine, at least one of (i) the IP address or (ii) the domain name of a portion of the plurality of users to the organization based on the information about existing associations.

15. The method of claim 1, wherein the historical data includes a greater number of data points over time than data points of the dataset.

16. The method of claim 5, further comprising:
applying a predictive model of the mapping system to the enriched dataset and the historical data.

17. The method of claim 16, further comprising:
processing, by the predictive model, two or more datasets over a time period, the two or more datasets including data related to a common set of users of the plurality of users;
determining, by the predictive model, whether the IP address of each of at least a portion of the common set of users are consistent over the time period; and
mapping, by the mapping system, the IP address of each of the at least the portion of the common set of users to the organization based on the determination.

18. The method of claim 1, wherein the dataset is a first dataset and the plurality of users is a first plurality of email users, the method further comprising:
receiving, by the analytics engine, a second dataset associated with a second plurality of email users, the second plurality of email users mutually non-exclusive with the first plurality of email users;
comparing, by the analytics engine, the second dataset to the first dataset; and
terminating, by the analytics engine, one or more existing mappings between the at least one of (i) the IP address or (ii) the domain name and the organization based on the comparison.

19. The method of claim 18, wherein the terminating, by the analytics engine, one or more existing mappings is based on a threshold.

20. The method of claim 1, wherein the dataset is received by the mapping system from a data provider, and wherein the data provider is:
(i) a messaging service provider and the plurality of users is a plurality of messaging users that send or receive messages through the messaging service provider,
(ii) a website that requires registration for use of the website by the plurality of users, or
(iii) a cryptography-related service that provides at least one of the IP address or domain name of each of the plurality of users.

* * * * *